United States Patent
Richter et al.

(10) Patent No.: US 12,249,253 B1
(45) Date of Patent: Mar. 11, 2025

(54) CONVERSATIONAL AGENT AS LEARNING AID

(71) Applicant: Apple Inc., Cupertino, CA (US)

(72) Inventors: Ian M. Richter, Los Angeles, CA (US); David Anders Winarsky, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/370,048

(22) Filed: Jul. 8, 2021

Related U.S. Application Data

(60) Provisional application No. 63/053,827, filed on Jul. 20, 2020.

(51) Int. Cl.
| | |
|---|---|
| *G09B 7/02* | (2006.01) |
| *G10L 13/027* | (2013.01) |
| *G10L 15/02* | (2006.01) |
| *G10L 15/22* | (2006.01) |

(52) U.S. Cl.
CPC ............. *G09B 7/02* (2013.01); *G10L 13/027* (2013.01); *G10L 15/02* (2013.01); *G10L 15/22* (2013.01)

(58) Field of Classification Search
CPC ......... G09B 7/02; G10L 13/027; G10L 15/02; G10L 15/22
See application file for complete search history.

(56) References Cited

U.S. PATENT DOCUMENTS

| | | | | |
|---|---|---|---|---|
| 6,062,862 | A * | 5/2000 | Koskinen | G09B 19/18 434/118 |
| 9,495,962 | B2 * | 11/2016 | Govrin | G06F 40/00 |
| 11,120,326 | B2 * | 9/2021 | Avrahami | G10L 15/197 |
| 2006/0166174 | A1 * | 7/2006 | Rowe | G09B 5/06 434/236 |
| 2009/0246744 | A1 * | 10/2009 | Lofthus | G09B 5/02 434/169 |
| 2013/0040275 | A1 * | 2/2013 | Gowda | G09B 5/06 434/322 |
| 2014/0024009 | A1 * | 1/2014 | Nealon | G09B 5/12 434/362 |
| 2014/0337370 | A1 * | 11/2014 | Aravamudan | G10L 15/22 707/759 |
| 2018/0150739 | A1 * | 5/2018 | Wu | G06N 20/10 |
| 2018/0190277 | A1 * | 7/2018 | Bhaya | G10L 15/22 |
| 2019/0259290 | A1 | 8/2019 | Lynch | |

(Continued)

FOREIGN PATENT DOCUMENTS

WO 2019090434 A1 5/2019

*Primary Examiner* — Eddy Saint-Vil
(74) *Attorney, Agent, or Firm* — DLA Piper LLP (US)

(57) ABSTRACT

Various implementations disclosed herein include devices, systems, and methods for generating a response to a user focus indicator value based on a user comprehension value characterizing a user's association with the user focus indicator value. In some implementations, a method includes obtaining a user focus indicator value. A sequence of user voice inputs relating to the user focus indicator value is obtained. A user comprehension value characterizing an assessment of a user relative to the user focus indicator value is determined based on the user voice inputs. Based on a plurality of media content items that provide information about the user focus indicator value, a response to the user focus indicator value is synthesized that satisfies the user comprehension value. The response is outputted.

39 Claims, 8 Drawing Sheets

(56) References Cited

U.S. PATENT DOCUMENTS

| | | |
|---|---|---|
| 2019/0306093 A1 | 10/2019 | Schilling et al. |
| 2020/0175058 A1* | 6/2020 | Peirce .................... G09B 19/00 |
| 2020/0184969 A1* | 6/2020 | Imai ........................ G10L 15/22 |
| 2020/0234606 A1* | 7/2020 | Anders .................... G09B 7/00 |
| 2020/0267183 A1* | 8/2020 | Vishwanath ............ G09B 19/00 |
| 2021/0005099 A1* | 1/2021 | Agley ...................... G09B 7/08 |

* cited by examiner

CONVERSATIONAL AGENT AS LEARNING AID

CROSS-REFERENCE TO RELATED APPLICATION

This application claims the benefit of U.S. Provisional Patent App. No. 63/053,827, filed on Jul. 20, 2020, which is incorporated by reference in its entirety.

TECHNICAL FIELD

The present disclosure generally relates to conversational agents.

BACKGROUND

A user device, such as a smartphone, tablet, or laptop or desktop computer, may include a conversational agent (e.g., expert system, artificial intelligence (AI) system, chat bot system, etc.). The conversational agent may be capable of performing a variety of useful tasks for a human user.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
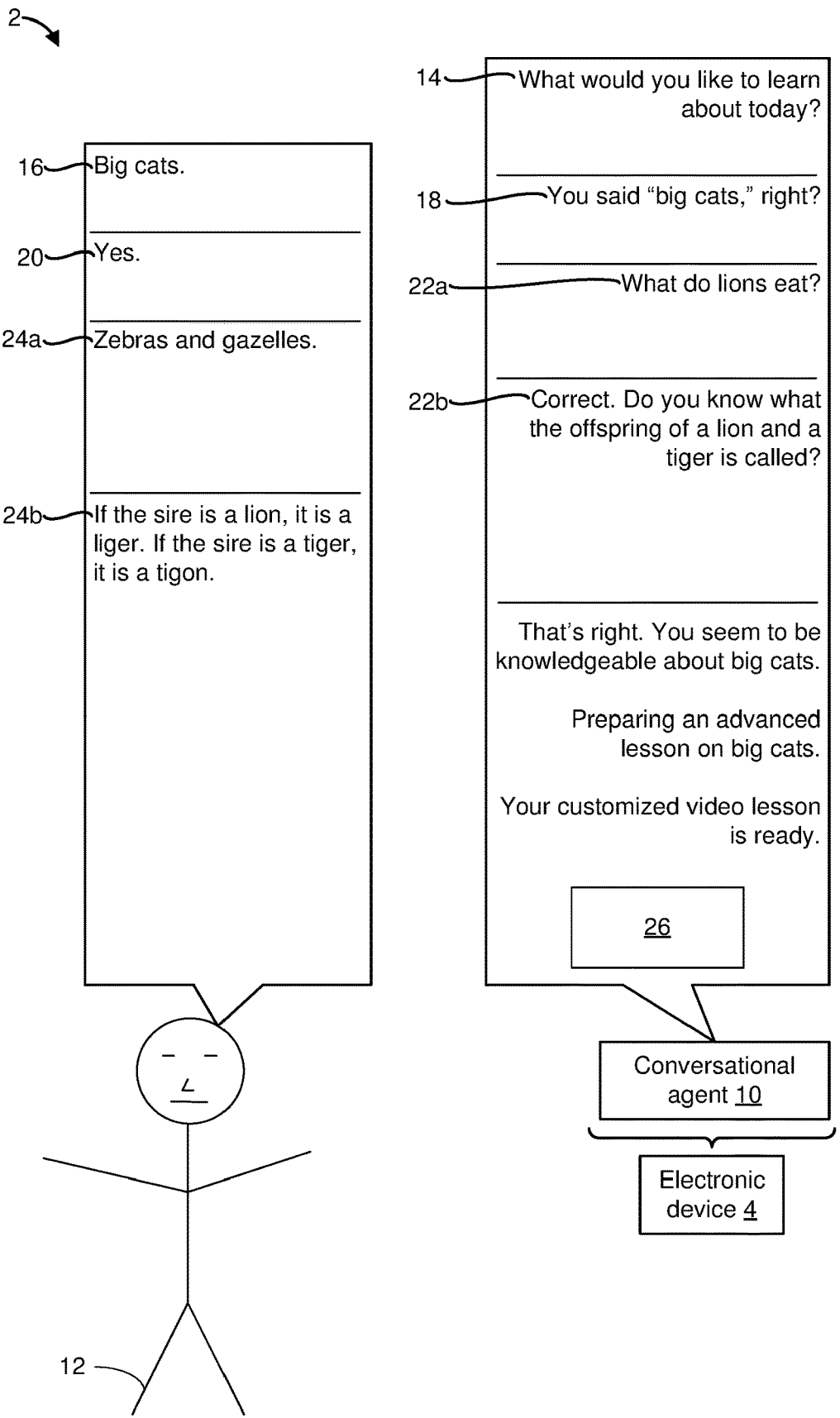
FIG. 1 illustrates an example operating environment according to some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for generating a response to a user focus indicator value based on a user comprehension value characterizing a user's association with the user focus indicator value. In some implementations, a method includes obtaining a user focus indicator value. A sequence of user voice inputs relating to the user focus indicator value is obtained. A user comprehension value characterizing an assessment of a user relative to the user focus indicator value is determined based on the user voice inputs. In some implementations, the method includes synthesizing a response to the user focus indicator value that satisfies the user comprehension value based on a plurality of media content items that provide information about the user focus indicator value. The response is outputted.

In accordance with some implementations, a device includes one or more processors, a non-transitory memory, and one or more programs. In some implementations, the one or more programs are stored in the non-transitory memory and are executed by the one or more processors. In some implementations, the one or more programs include instructions for performing or causing performance of any of the methods described herein. In accordance with some implementations, a non-transitory computer readable storage medium has stored therein instructions that, when executed by one or more processors of a device, cause the device to perform or cause performance of any of the methods described herein. In accordance with some implementations, a device includes one or more processors, a non-transitory memory, and means for performing or causing performance of any of the methods described herein.
—DESCRIPTION Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Various processes defined herein consider the option of obtaining and utilizing a user's personal information. For example, such personal information may be utilized in order to generate a response to a user focus indicator value using an electronic device. However, to the extent such personal information is collected, such information should be obtained with the user's informed consent. As described herein, the user should have knowledge of and control over the use of their personal information.

Personal information will be utilized by appropriate parties only for legitimate and reasonable purposes. Those parties utilizing such information will adhere to privacy policies and practices that are at least in accordance with appropriate laws and regulations. In addition, such policies are to be well-established, user-accessible, and recognized as in compliance with or above governmental/industry standards. Moreover, these parties will not distribute, sell, or otherwise share such information outside of any reasonable and legitimate purposes.

Users may, however, limit the degree to which such parties may access or otherwise obtain personal information. For instance, settings or other preferences may be adjusted such that users can decide whether their personal information can be accessed by various entities. Furthermore, while some features defined herein are described in the context of using personal information, various aspects of these features can be implemented without the need to use such information. As an example, if user preferences, account names, and/or location history are gathered, this information can be obscured or otherwise generalized such that the information does not identify the respective user.

The present disclosure provides methods, systems, and/or devices for generating a response to a user focus indicator value based on a user comprehension value characterizing a user's association with the user focus indicator value.

In various implementations, a user device, such as a smartphone, tablet, or laptop or desktop computer, includes a conversational agent (e.g., an expert system, an artificial intelligence (AI) system, a chat bot system, etc.). The conversational agent may be capable of performing a variety of useful tasks for a human user. For example, the conversational agent may be capable of delivering informational or educational content to the user.

When the conversational agent generates a response to a query (e.g., an answer to a question), a content delivery system may provide universal answers. For example, if a user asks the conversational agent about a subject of interest, the conversational agent may provide an excerpt from a crowd-sourced encyclopedia. The conversational agent may provide an audio output corresponding to a text of the excerpt, which the user may perceive as a reading of the excerpt. However, such universal answers may not be appropriate for all users. For example, an excerpt from a crowd-sourced encyclopedia may not account for an age of the user or a level of knowledge of the user. This can lead to responses failing to meet the needs of the user. For example, a response may cover subject matter at a level of detail that is too high or too low to be useful to the user. Providing unsatisfactory responses tends to detract from a user experience of the device. Providing responses that are not suitable for the user may cause the user to unnecessarily provide additional user inputs that correspond to searching for additional information that is more suitable for the user. Causing the user to unnecessarily provide additional user inputs tends to reduce a battery life of a battery-operated device thereby adversely affecting operability of the device.

In some implementations, a conversational agent obtains an input that is indicative of a user focus indicator value. The user focus indicator value may be, for example, a learning objective. In some implementations, the user focus indicator value indicates a learning objective. The learning objective may be a subject about which a user of the device is interested in learning. In some implementations, the learning objective is a list of key facts to be retained from a news content item. The input may include a voice input, such as a spoken query from a user. The input may include a spoken response to a query or a statement that was presented via the conversational agent to the user.

In some implementations, the conversational agent obtains a user comprehension value. The user comprehension value characterizes an assessment of the user relative to the user focus indicator value. For example, in some implementations, the user comprehension value indicates the user's comprehension level of a subject indicated by the user focus indicator value.

In some implementations, the conversational agent generates follow-up questions regarding the subject indicated by the user focus indicator value based on the user's responses and the user comprehension value. The conversational agent may receive inputs from the user relating to the subject indicated by the user focus indicator value. These inputs may include responses to questions presented by the conversational agent and/or questions asked by the user, e.g., in response to statements presented by the conversational agent.

Based on the inputs, the conversational agent may determine the user comprehension value that indicates the user's comprehension of the subject indicated by the user focus indicator value. In some implementations, the conversational agent synthesizes a response to the user focus indicator value that satisfies the user comprehension value based on a plurality of media content items that provide information about the user focus indicator value. The conversational agent may present the response to the user.

Since the conversational agent synthesizes the response based on the user comprehension value, the response tends to be tailored to a level of knowledge of the user. As such, the response synthesized by the conversational agent is more likely to be relevant to the user than a generic response that is note tailored to the level of knowledge of the user. For example, unlike a generic response that may cover the subject at a level of detail that is too high or too low to be useful to the user, the response synthesized by the conversational agent is more likely to be at a level of detail that is useful to the user. Providing satisfactory responses tends to enhance a user experience of the device. Providing responses that are suitable for the user tends to reduce a likelihood of the user providing unnecessary user inputs that correspond to searching for additional information that is more suitable for the user. Reducing the need for unnecessary user inputs tends to prolong a battery life of a battery-operated device thereby improving operability of the device.

Various examples of electronic systems and techniques for using such systems in relation to various enhanced reality technologies are described. In some implementations, virtual object kits are used to generate variations of respective virtual object types, known as virtual object variations. The virtual object variations may be generated by varying a characteristic parameter that is associated with an associated virtual object kit. When a request to assemble a target virtual object is received, one or more virtual object kits may be identified based on a degree of similarity between the target virtual object and the virtual object variations generated using the virtual object kits.

FIG. 1 is a block diagram of an example operating environment 2 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 2 includes an electronic device 4 and a user 12.

In some implementations, the electronic device 4 includes a handheld computing device that can be held by the user 12. For example, in some implementations, the electronic device 4 includes a smartphone, a tablet, a media player, a laptop, or the like. In some implementations, the electronic device 4 includes a desktop computer. In some implementations, the electronic device 4 includes a wearable computing device that can be worn by the user 12. For example, in some implementations, the electronic device 4 includes a head-mountable device (HMD), an electronic watch or a pair of headphones. In some implementations, the electronic device 4 is a dedicated virtual assistant device that includes a speaker for playing audio and a microphone for receiving verbal commands. In some implementations, the electronic device 4 includes a television or a set-top box that outputs video data to a television.

In various implementations, the electronic device 4 includes (e.g., implements) a conversational agent 10 that generates a response to a user focus indicator value based on a user comprehension value characterizing an assessment of the user 12 relative to the user focus indicator value. In some implementations, the conversational agent 10 obtains a user focus indicator value. In various implementations, the user focus indicator value indicates a subject that the user 12 is interested in learning about. In some implementations, the conversational agent 10 presents a statement 14 (e.g., a question) to the user 12 to prompt the user 12 to provide a voice input. The user 12 may provide a voice input 16 in response to the statement 14 that indicates the user focus indicator value (e.g., a subject that the user is interested in learning about, for example, "big cats" in the example of FIG. 1). In some implementations, the conversational agent 10 analyzes the voice input 16 (e.g., the conversational agent 10 performs a semantic assessment of the voice input 16) to determine the user focus indicator value. In some implementations, the conversational agent 10 presents another statement 18 to the user 12 to prompt the user 12 to confirm the user focus indicator value. The user 12 may respond to the statement 18 with another voice input 20 confirming the user focus indicator value.

In some implementations, the conversational agent 10 presents a sequence of statements 22a, 22b to the user 12 to determine a user comprehension value that characterizes an assessment of the user 12 relative to the user focus indicator value. In some implementations, the user comprehension value indicates how well the user 12 understands the subject indicated by the user focus indicator value. In some implementations, the user comprehension value indicates a level of knowledge that the user 12 possesses regarding the subject indicated by the user focus indicator value. The statements 22a, 22b may include questions relating to the user focus indicator value that are selected to assess the user's level of knowledge of a topic. In some implementations, the questions increase in difficulty, for example, until the user is unable to answer a question correctly. In some implementations, the questions are presented in an arbitrary order, and the user's level of knowledge is assessed after all of the questions are presented. The user 12 may respond to the statements 22a, 22b with a corresponding sequence of voice inputs 24a, 24b. In some implementations, the conversational agent 10 determines the user comprehension value based on the sequence of voice inputs 24a, 24b. For example, the conversational agent 10 may determine the user comprehension value based on whether the sequence of voice inputs 24a, 24b represent correct responses to the statements 22a, 22b.

In some implementations, the conversational agent 10 selects statements in the sequence of statements 22a, 22b based on the sequence of voice inputs 24a. 24b. For example, the conversational agent 10 may select the statement 22b based on the voice input 24a provided by the user 12 in response to the statement 22a.

In some implementations, the conversational agent 10 synthesizes a response 26 to the user focus indicator value that satisfies the user comprehension value. For example, the conversational agent 10 may determine that the user 12 has an advanced level of knowledge relating to the user focus indicator value and may synthesize a response 26 that conveys information relating to the user focus indicator value at an advanced level. The response 26 may be based on media content items that provide information about the user focus indicator value. In some implementations, the conversational agent 10 synthesizes the response 26 by incorporating media content items or portions of media content items in the response. For example, the conversational agent 10 may incorporate a first portion of a first media content item and a second portion of a second media content item in the response 26. As such, in some implementations, the response 26 includes a set of one or more media content items that provide information regarding the subject indicated by the user focus indicator value at a comprehension level that matches the user comprehension value.

In some implementations, the conversational agent 10 outputs the response 26. For example, the conversational agent 10 may output the response 26 via a speaker. In some implementations, the conversational agent 10 outputs the response 26 using an accessory device that is in communication with the conversational agent 10 via a wired or wireless connection. For example, the conversational agent 10 may output the response 26 using wired or wireless headphones or an external speaker that communicates with the conversational agent 10 using a wireless communication link operating using, e.g., a BLUETOOTH® wireless communication protocol. In some implementations, the response 26 includes a visual component. The conversational agent 10 may output the visual component, for example, using a display.

Figure 2A:
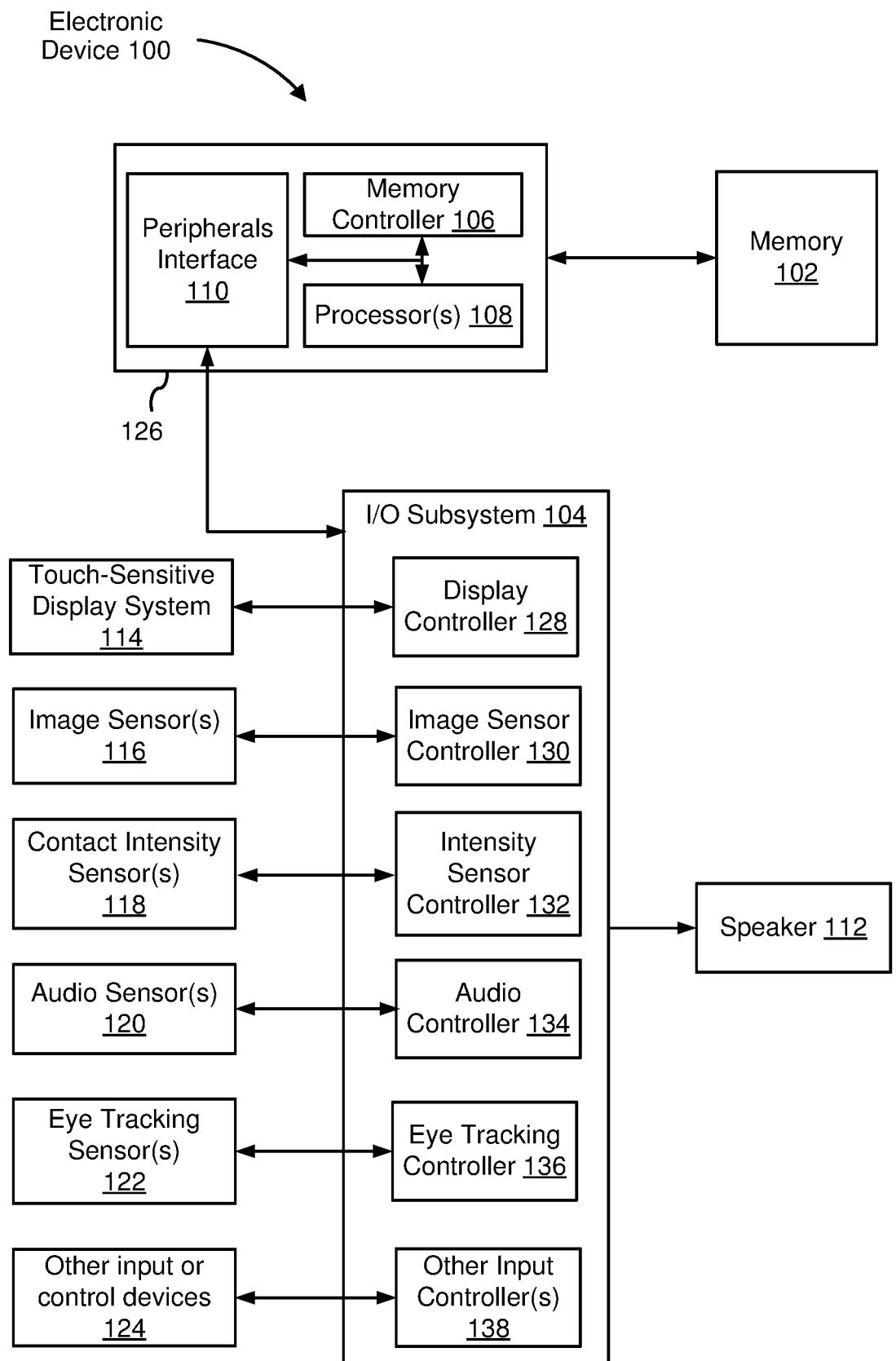
FIG. 2A depicts an exemplary system for use in various computer enhanced technologies.

FIG. 2A is a block diagram of an electronic device 100 in accordance with some implementations. In some implementations, the electronic device 100 implements the electronic device 4 shown in FIG. 1. The electronic device 100 includes a memory 102 (which optionally includes one or more computer readable storage mediums). The memory 102 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 102 comprises a non-transitory computer readable storage medium. The electronic device 100 includes an input/output (I/O) subsystem 104, a memory controller 106, one or more processor(s) 108, a peripherals interface 110, a speaker 112, a touch-sensitive display system 114, one or more image sensor(s) 116 (e.g., a camera), one or more contact intensity sensor(s) 118, one or more audio sensor(s) 120 (e.g., a microphone), one or more eye tracking sensor(s) 122 (e.g., included within a head-mounted display (HMD)), and one or more other input or control device(s) 124.

In some implementations, the memory controller 106, the one or more processor(s) 108, and the peripherals interface 110 are implemented on a single chip, such as a chip 126. In some implementations, they are implemented on separate chips.

The I/O subsystem 104 couples input/output peripherals on the electronic device 100, such as the touch-sensitive display system 114 and the other input or control device(s) 124, with the peripherals interface 110. The I/O subsystem 104 optionally includes a display controller 128, an image sensor controller 130, an intensity sensor controller 132, an audio controller 134, an eye tracking controller 136, and one or more input controller(s) 138 for other input or control devices. The one or more input controller(s) 138 receive/send electrical signals from/to the other input or control device(s) 124. The other input or control device(s) 124 optionally include physical buttons (e.g., push buttons, rocker buttons, etc.), dials, slider switches, joysticks, click wheels, and so forth. In some implementations, the one or more input controller(s) 138 are, optionally, coupled with any (or none) of the following: a keyboard, infrared port, USB port, stylus, and/or a pointer device such as a mouse. The one or more buttons optionally include an up/down button for volume control of the speaker 112 and/or audio sensor(s) 120. The one or more buttons optionally include a push button.

In some implementations, the touch-sensitive display system 114 provides an input interface and an output interface between the electronic device 100 and a user. The display controller 128 receives and/or sends electrical signals from/to the touch-sensitive display system 114. The touch-sensitive display system 114 displays visual output to the user. The visual output optionally includes graphics, text, icons, video, and any combination thereof (collectively termed "graphics"). In some implementations, some or all of the visual output corresponds to user interface objects. In some implementations, an affordance may include a user-interactive graphical user interface object. The affordance may be configured to respond to inputs directed toward the graphical user interface object. Examples of user-interactive graphical user interface objects include, without limitation, buttons, sliders, icons, selectable menu items, switches, hyperlinks, or other user interface controls.

In some implementations, the touch-sensitive display system 114 has a touch-sensitive surface, sensor, or set of sensors that accepts input from the user based on haptic and/or tactile contact. The touch-sensitive display system 114 and the display controller 128, along with any associated modules and/or sets of instructions in the memory 102, detect contact (and any movement or breaking of the contact) on the touch-sensitive display system 114 and convert the detected contact into interaction with user-interface objects (e.g., one or more soft keys, icons, web pages or images) that are displayed on the touch-sensitive display system 114. In some implementations, a point of contact between the touch-sensitive display system 114 and the user corresponds to a finger of the user or a stylus.

In some implementations, the touch-sensitive display system 114 uses liquid crystal display (LCD) technology, light emitting polymer (LPD) technology, light emitting diode (LED) technology, and/or other display technologies. The touch-sensitive display system 114 and the display controller 128 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with the touch-sensitive display system 114.

In some implementations, the user contacts the touch-sensitive display system 114 using a suitable object or appendage, such as a stylus, a finger, or the like. In some implementations, the user interface is designed to work with finger-based contacts and gestures, which can be less precise than stylus-based input due to the larger area of contact of a finger on the touch screen. In some implementations, the electronic device 100 translates the rough finger-based input into a precise pointer/cursor position or command for performing the actions desired by the user.

In some implementations, the speaker 112 and the audio sensor(s) 120 provide an audio interface between the user and the electronic device 100. Audio circuitry receives audio data from the peripherals interface 110, converts the audio data to an electrical signal, and transmits the electrical signal to the speaker 112. The speaker 112 converts the electrical signal to human-audible sound waves. The audio circuitry receives electrical signals converted from audio signals by the audio sensor(s) 120. The audio circuitry converts the electrical signals to audio data and transmits the audio data to the peripherals interface 110 for processing. In some implementations, the peripherals interface 110 communicates audio data with the memory 102 and/or RF circuitry. In some implementations, the audio circuitry includes a headset jack. The headset jack provides an interface between audio circuitry and removable audio input/output peripherals, such as output-only headphones or a headset with both output (e.g., a headphone for one or both ears) and input (e.g., a microphone).

The image sensor(s) 116 capture still images and/or video. In some implementations, the image sensor(s) 116 include one or more rear-facing image sensor(s) that are located on the back of the electronic device 100, opposite a touch screen on the front of the electronic device 100, so that the touch screen is enabled for use as a viewfinder for still and/or video image acquisition. In some implementations, the image sensor(s) 116 include a front-facing image sensor that is located on the front of the electronic device 100 so that the user's image is obtained (e.g., for videoconferencing while the user views the other video conference participants on the touch screen).

The contact intensity sensor(s) 118 detect intensity of contacts on the electronic device 100 (e.g., a touch input on a touch-sensitive surface of the electronic device 100). The contact intensity sensors 118 are coupled with the intensity sensor controller 132 in the I/O subsystem 104. The contact intensity sensor(s) 118 optionally include one or more piezoresistive strain gauges, capacitive force sensors, electric force sensors, piezoelectric force sensors, optical force sensors, capacitive touch-sensitive surfaces, and/or other intensity sensors (e.g., sensors used to measure the force (or pressure) of a contact on a touch-sensitive surface). The contact intensity sensor(s) 118 receive contact intensity information (e.g., pressure information or a proxy for pressure information) from the environment. In some implementations, at least one contact intensity sensor 118 is collocated with, or proximate to, a touch-sensitive surface of the electronic device 100. In some implementations, at least one contact intensity sensor 118 is located on the back of the electronic device 100.

The eye tracking sensor(s) 122 detect eye gaze of a user of the electronic device 100 and generate eye tracking data indicative of the eye gaze of the user. In various implementations, the eye tracking data includes data indicative of a fixation point (e.g., point of regard) of the user on a display panel, such as a display panel within a head-mounted display (HMD) or within a heads-up display.

Figure 2B:
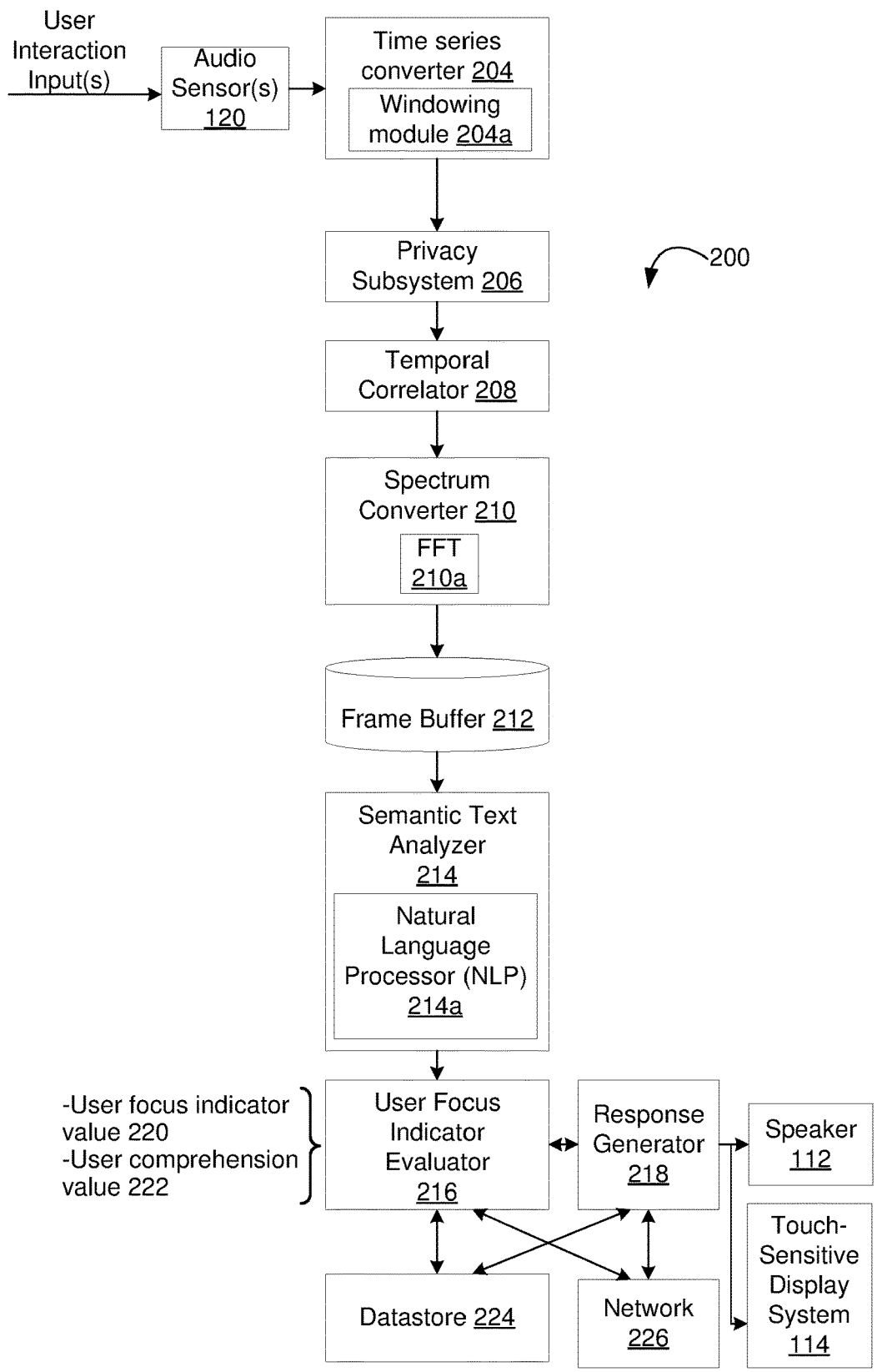
FIG. 2B illustrates a block diagram of a conversational agent according to some implementations.

FIG. 2B is a block diagram of an example conversational agent 200. In some implementations, the conversational agent 200 implements the conversational agent 10 shown in FIG. 1. In some implementations, the conversational agent 200 resides at (e.g., is implemented by) the electronic device 4 shown in FIG. 1. In some implementations, the conversational agent 200 resides at (e.g., is implemented by) the electronic device 100 shown in FIG. 2A. In various implementations, the conversational agent 200 generates a response to a user focus indicator value based on a user comprehension value characterizing a user's association with the user focus indicator value, in accordance with some implementations. In various implementations, the conversational agent 200 includes some or all of the components of the electronic device 100 of FIG. 2A. For example, in some implementations, the conversational agent 200 includes the speaker 112 and the audio sensor(s) 120. In some implementations, the conversational agent 200 includes one or more additional sensor(s) 202, which may include one or more of the touch-sensitive display system 114, the image sensor(s) 116, the contact intensity sensor(s) 118, the eye tracking sensor(s) 122, and/or the other input or control device(s) 124 of FIG. 2A.

In various implementations, the conversational agent 200 or portions thereof are included in a device or system enabled with one or more machine-listening applications, such as a communication device included in an autonomous vehicle, a computer, a laptop computer, a tablet device, a mobile phone, a smartphone, a wearable device (e.g., a smart watch), a gaming device, a hearing aid, an Internet-of-things (IoT) device, an extended reality (XR) device (e.g., an HMD) that displays XR content, such as augmented reality (AR) content, virtual reality (VR) content, and/or mixed-reality content (MR) content, and/or the like.

While pertinent features are illustrated, those of ordinary skill in the art will appreciate from the present disclosure that various other features have not been illustrated for the sake of brevity and so as not to obscure more pertinent aspects of the implementations disclosed herein. Those of ordinary skill in the art will also appreciate from the present disclosure that the functions and sub-functions implemented by the conversational agent 200 can be combined into one or more systems and/or further sub-divided into additional subsystems; and, that the functionality described below is provided as merely one example configuration of the various aspects and functions described herein.

In some implementations, the conversational agent 200 includes one or more audio sensor(s) 120, a time series converter 204, a privacy subsystem 206, a temporal correlator 208, a spectrum converter 210, a frame buffer 212, a semantic text analyzer 214, a user focus indicator evaluator 216, a response generator 218, and the speaker 112.

In some implementations, the audio sensor(s) 120 detect user interaction inputs corresponding to sound, such as human speech. The audio sensor(s) 120 receive and convert the sound into electronic signal data (e.g., audible signal data) that can be stored in a non-transitory memory. In some implementations, audible signal data is captured from within an adverse acoustic environment and includes ambient noise, interfering sounds, and background chatter in addition to a target voice of interest.

In some implementations, the audio sensor(s) 120 provide the audible signal data as an ongoing or continuous time series of values. In turn, the times series converter 204 is configured to generate two or more temporal frames of audible signal data from a continuous stream of audible signal data. Each temporal frame of audible signal data includes a temporal portion of the audible signal received by the audio sensor(s) 120. In some implementations, the times series converter 204 includes a windowing module 204a that is configured to mark and separate one or more temporal frames or portions of the audible signal data for times t1, t2 . . . tn. In some implementations, each temporal frame of the audible signal data is conditioned by a pre-filter (not shown). For example, in some implementations, pre-filtering includes band-pass filtering to isolate and/or emphasize the portion of the frequency spectrum typically associated with human speech. In some implementations, pre-filtering includes pre-emphasizing portions of one or more temporal frames of the audible signal data in order to adjust the spectral composition of the one or more temporal frames of the audible signal data. In some implementations, the windowing module 204a is configured to retrieve the audible signal data from a non-transitory memory. In some implementations, pre-filtering includes filtering the received audible signal using a low-noise amplifier (LNA) in order to substantially set a noise floor for further processing. In some implementations, a pre-filtering LNA is arranged between the audio sensor(s) 120 and the time series converter 204. Those of ordinary skill in the art will appreciate that numerous other pre-filtering techniques may be applied to the received audible signal, and those highlighted herein are merely examples of numerous pre-filtering options available.

In various implementations, the conversational agent 200 includes a privacy subsystem 206 that includes one or more privacy setting filters associated with user information, such as user information included in the user interaction inputs received by the audio sensor(s) 120, and/or identifying information. In some implementations, the privacy subsystem 206 selectively prevents and/or limits the conversational agent 200 or portions thereof from obtaining and/or transmitting the user information. To this end, the privacy subsystem 206 receives user preferences and/or selections from the user in response to prompting the user for the same. In some implementations, the privacy subsystem 206 prevents the conversational agent 200 from obtaining and/or transmitting the user information unless and until the privacy subsystem 206 obtains informed consent from the user. In some implementations, the privacy subsystem 206 anonymizes (e.g., scrambles or obscures) certain types of user information. For example, the privacy subsystem 206 receives user inputs designating which types of user information the privacy subsystem 206 anonymizes. As another example, the privacy subsystem 206 anonymizes certain types of user information likely to include sensitive and/or identifying information, independent of user designation (e.g., automatically).

The temporal correlator 208 is provided to correlate detected speech by the audio sensor(s) with additional input(s), for example, detected by other sensors, such as the touch-sensitive display system 114, the image sensor(s) 116, the contact intensity sensor(s) 118, the eye tracking sensor(s) 122, and/or other input or control device(s) 124. In some implementations, the temporal correlator 208 correlates audio data with video data, such as body language video data and situational context video data that may be captured, for example, by the image sensor(s) 116.

In some implementations, the temporal correlator 208 cooperates with the time series converter 204 in correlating speech data with other data. For example, in some implementations, the temporal correlator 208 generates two or more temporal frames of correlated data from a continuous stream of various types of data, including audible signal data, video data, eye gaze data, image data, extended reality (XR) data (e.g., AR, VR, MR data), text data, and/or the like. In some implementations, the temporal correlator 208 utilizes the temporal frames of audible signal data generated by the time series converter 204.

The spectrum converter 210 operates to generate a corresponding frequency domain representation for each of the one or more correlated temporal frames generated by the temporal correlator 208, so that one or more spectral characteristics of the correlated data can be determined for each frame. In some implementations, the frequency domain representation of a temporal frame includes at least one of a plurality of sub-bands contiguously distributed throughout the frequency spectrum associated with voiced sounds. In some implementations, for example, the spectrum converter 210 includes a Fast Fourier Transform (FFT) module 210a. In some implementations, a 32-point short-time FFT is used for conversion into the frequency domain. Those of ordinary skill in the art will appreciate that any number of FFT implementations are used in various implementations. In various implementations, the FFT module 210a may also be replaced with a Goertzel module. In some implementations, the FFT module 210a may also be replaced with any suitable implementation of a wavelet decomposition module, constant-Q transform and/or a set of redundant basis function modules configured to capture pertinent spectral characteristics of the input signal. In some implementations, an optional spectral filter module (not shown) is configured to receive and adjust the spectral composition of the frequency domain representations of the one or more frames. In some implementations, for example, the spectral filter module is configured to one of emphasize, deemphasize, and/or isolate one or more spectral components of a temporal frame in the frequency domain. The frequency domain representations of the one or more frames are stored in the frame buffer 212.

In some implementations, the semantic text analyzer 214 determines semantic assessments of the audible signal data generated by the time series converter 204 and/or the correlated temporal frames generated by the temporal correlator 208. A semantic assessment corresponds to an understanding or meaning of a word or word combination corresponding to a portion of the audible signal data and/or a subset of the correlated temporal frames. In some implementations, each semantic assessment includes one or more candidate interpretations of a word or word combination. In some implementations, the semantic text analyzer 214 includes a natural language processor (NLP) 214a that generates the semantic assessments.

In some implementations, the user focus indicator evaluator 216 obtains a user focus indicator value 220. For example, the user focus indicator evaluator 216 may analyze the semantic assessments to determine a subject matter that the user is focused on (e.g., a topic about which the user wishes to learn). In some implementations, the user focus indicator evaluator 216 obtains a sequence of user voice inputs that relate to the user focus indicator value 220. For example, the user focus indicator evaluator 216 may obtain responses from the user to statements (e.g., questions) that are presented to the user by the conversational agent 200. In various implementations, the user focus indicator evaluator 216 determines the user focus indicator value by identifying a subject that the user is interested in learning about.

In some implementations, the user is interested in learning about multiple subjects. In such implementations, the user focus indicator evaluator 216 determines the user focus indicator value 220 by identifying the subject that the user is most interested in learning about. For example, the user focus indicator evaluator 216 determines respective user interest scores for the subjects, and selects the subject with the highest user interest score as the subject that the user is most interested in learning about.

In some implementations, the user focus indicator evaluator 216 determines a user comprehension value 222. The user comprehension value 222 characterizes an assessment of the user relative to the user focus indicator value based on the user voice inputs. In some implementations, the user focus indicator evaluator 216 determines the user comprehension value 222 by assessing how well the user understands the subject indicated by the user focus indicator value. In some implementations, the user focus indicator evaluator 216 determines the user comprehension value 222 by determining (e.g., estimating) an amount of knowledge that the user possesses regarding the subject indicated by the user focus indicator value. In some implementations, for example, the conversational agent 200 presents statements (e.g., questions) to the user that are selected to assess the user's level of knowledge of a topic. The conversational agent 200 may obtain responses from the user to the presented statements. In some implementations, the user focus indicator evaluator 216 presents additional statements to the user based on the user's responses to the previously presented statements.

In some implementations, the user focus indicator evaluator 216 obtains (e.g., receives, determines, and/or synthesizes) additional statements to present to the user based on information received, for example, from a datastore 224 and/or from a resource available via a network 226, such as a local area network (LAN), wide area network (WAN), intranet, or the Internet. For example, the user focus indicator evaluator 216 may receive additional questions to present to the user based on the user's responses to previously presented questions from the datastore 224. As another example, the user focus indicator evaluator 216 may receive additional information relating to the user focus indicator value from a resource available via the network 226 and may determine statements to present to the user to confirm the user's knowledge of the additional information.

In some implementations, the user focus indicator evaluator 216 determines the user comprehension value 222 based on a sequence of user voice inputs. For example, the user focus indicator evaluator 216 may determine the user comprehension value 222 based on the user's response to the initially presented statement or statements as well as the user's responses to subsequently presented statements.

In some implementations, the response generator 218 synthesizes a response to the user focus indicator value 220 that satisfies the user comprehension value 222. For example, the response generator 218 may synthesize a response that conveys information relating to the subject indicated by the user focus indicator value 220 at a level that is appropriate to the user's level of comprehension indicated by the user comprehension value 222. The response may be based on media content items that provide information about the subject indicated by the user focus indicator value 220. In some implementations, the response generator 218 synthesizes the response by incorporating media content items or portions of media content items in the response. For example, the response generator 218 may incorporate a first portion of a first media content item and a second portion of a second media content item in the response.

In some implementations, the response generator 218 obtains the media content items or the portions of the media content items from the datastore 224 and/or from a resource available via the network 226. The response generator 218 may obtain the media content items or the portions of the media content items from different sources. For example, the response generator 218 may obtain a first portion of a first media content item from the datastore 224 and a second portion of a second media content item from the resource available via the network 226. The response generator 218 may combine the first portion of the first media content item and the second portion of the second media content item to synthesize the response.

In some implementations, the conversational agent 200 outputs the response. For example, the conversational agent 200 may output the response via the speaker 112. In some implementations, the conversational agent 200 outputs the response using an accessory device that is in communication with the conversational agent 200 via a wired or wireless connection. For example, the conversational agent 200 may output the response using wired or wireless headphones or an external speaker that communicates with the conversational agent 200 using a wireless communication link operating using, e.g., a BLUETOOTH® wireless communication protocol. In some implementations, the response includes a visual component. The visual component may be outputted, for example, using the touch-sensitive display system 114 or an accessory device that is in communication with the conversational agent 200 via a wired or wireless connection, such as an external display.

Figure 3:
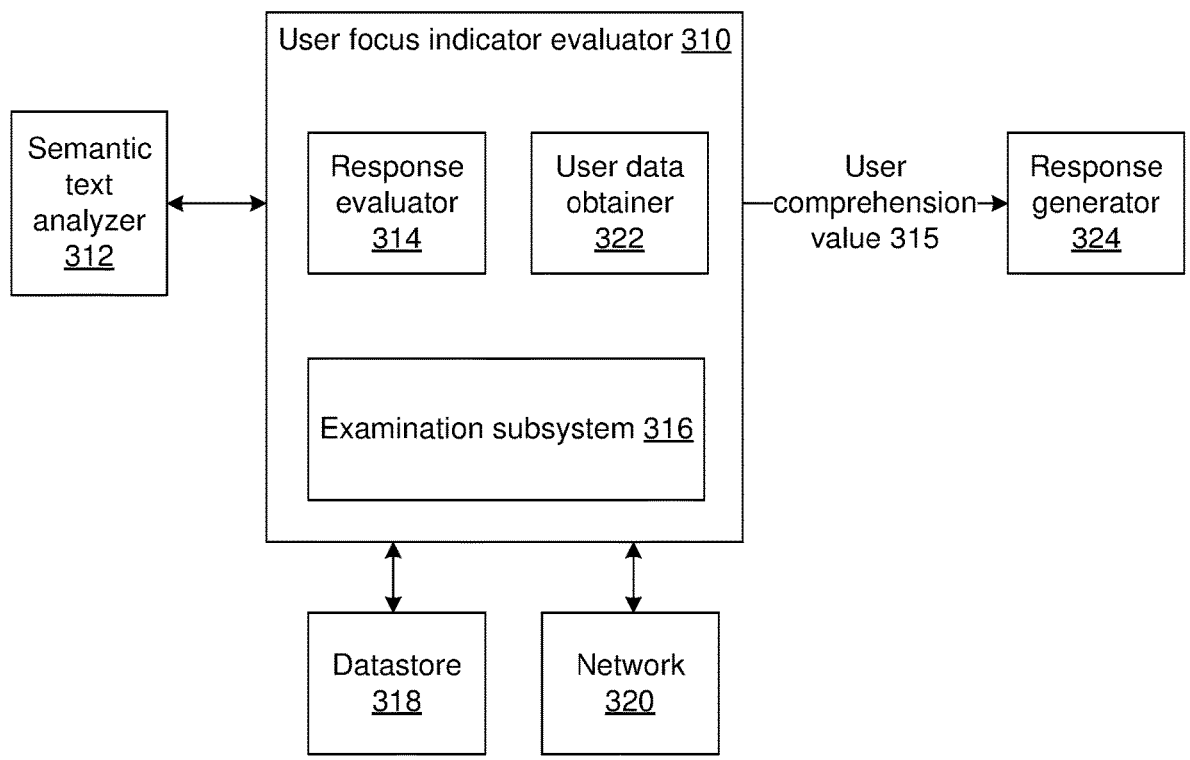
FIG. 3 is a block diagram of an example user focus indicator evaluator according to some implementations.

FIG. 3 is a block diagram of an example user focus indicator evaluator 310 according to some implementations. While pertinent features are illustrated those of ordinary skill in the art will appreciate that various other features have not been illustrated for the sake of brevity and so as not to obscure more pertinent aspects of the implementations disclosed herein. In some implementations, the user focus indicator evaluator 310 or portions thereof are similar to and adapted from the user focus indicator evaluator 216 of FIG. 2B. In some implementations, the user focus indicator evaluator 310 implements the user focus indicator evaluator 216 shown in FIG. 2B.

In some implementations, the user focus indicator evaluator 310 obtains semantic assessment information from a semantic text analyzer 312. The semantic text analyzer 312 or portions thereof may be similar to and adapted from the semantic text analyzer 214 of FIG. 2B and may incorporate the NLP 214a. The semantic assessment information may represent a user's response to a statement (e.g., a question) presented to the user by the conversational agent 200.

In some implementations, a response evaluator 314 evaluates the response to determine a user comprehension value 315. The user comprehension value 315 may characterize an assessment of the user relative to the user focus indicator value. In some implementations, the response evaluator 314 evaluates the user's response at least in part by comparing the response with a model response and determining a rating of the response based on a degree of similarity between the response and the model response.

In some implementations, an examination subsystem 316 determines one or more additional statements (e.g., questions) to present to the user based on the user's responses to previously presented statements (e.g., questions). For example, the examination subsystem 316 may determine one or more additional statements that are designed to elicit user responses that may characterize the assessment of the user relative to the user focus indicator value. In some implementations, the examination subsystem 316 may obtain the one or more additional statements from a datastore 318 (e.g., the datastore 224 of FIG. 2B) and/or a resource available via a network 320 (e.g., the network 226 of FIG. 2B).

In some implementations, the examination subsystem 316 may repeat determining additional statements to present to the user. For example, the examination subsystem 316 may determine a preset number of additional statements. In some implementations, the examination subsystem 316 determines the additional statements based on a rubric. The rubric may specify a sequence of statements to present based on user responses. In some implementations, the examination subsystem 316 continues to repeat determining additional statements to present to the user until a confidence threshold associated with the user comprehension value 315 is satisfied.

In some implementations, a user data obtainer 322 obtains characteristic information relating to the user. The user focus indicator evaluator 310 may use the characteristic information to determine the user comprehension value 315. In some implementations, the characteristic information includes information relating to one or more of the cognitive capability, educational background, and/or level of experience with the user focus indicator value. The user data obtainer 322 may obtain the characteristic information from a user profile. In some implementations, the user data obtainer 322 receives user input indicative of the characteristic information, e.g., from a user input device, such as a keyboard, mouse, and/or touch-sensitive display.

When the user focus indicator evaluator 310 has determined the user comprehension value 315, the user focus indicator evaluator 310 provides the user comprehension value 315 to a response generator 324. In some implementations, the response generator 324 or portions thereof are similar to and adapted from the response generator 218 of FIG. 2B.

Figure 4:
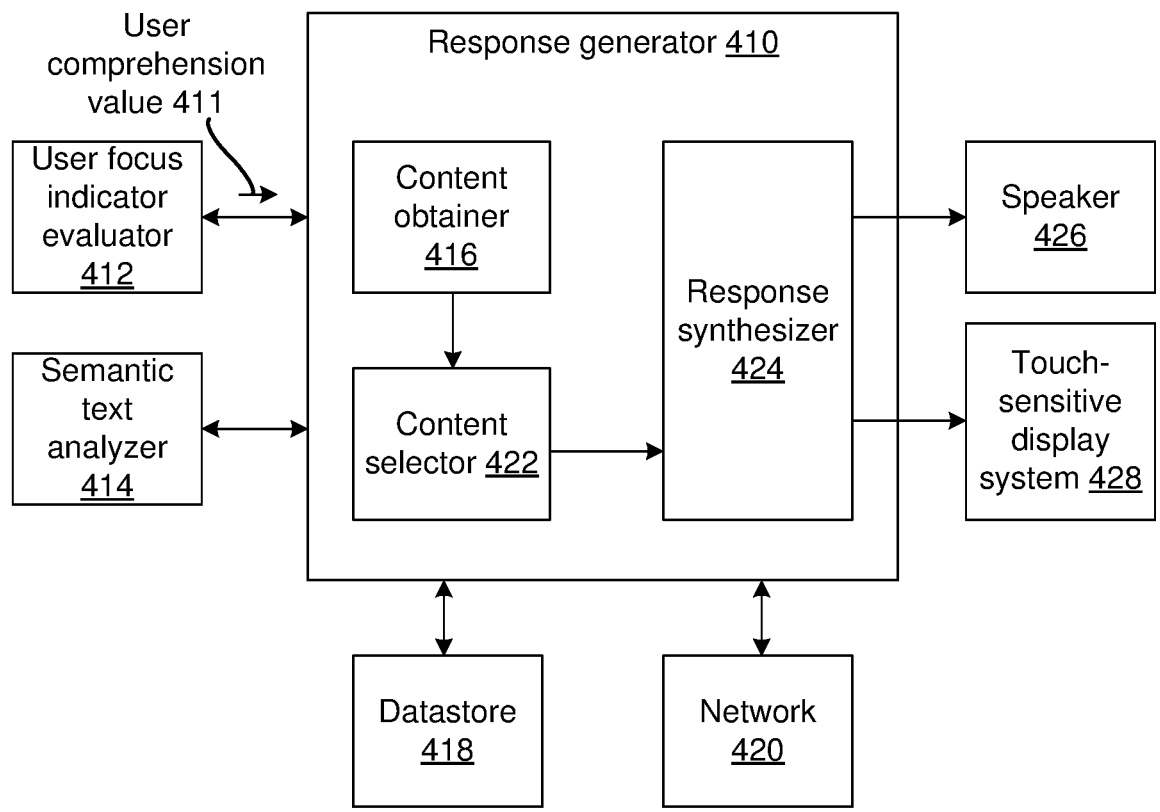
FIG. 4 is a block diagram of an example response generator according to some implementations.

FIG. 4 is a block diagram of an example response generator 410 according to some implementations. While pertinent features are illustrated those of ordinary skill in the art will appreciate that various other features have not been illustrated for the sake of brevity and so as not to obscure more pertinent aspects of the implementations disclosed herein. In some implementations, the response generator 410 or portions thereof are similar to and adapted from the response generator 218 of FIG. 2B and/or the response generator 324 of FIG. 3. In some implementations, the response generator 410 implements the response generator 218 shown in FIG. 2B and/or the response generator 324 shown in FIG. 3.

In some implementations, the response generator 410 obtains a user comprehension value 411 from a user focus indicator evaluator 412. In some implementations, the user focus indicator evaluator 412 or portions thereof are similar to and adapted from the user focus indicator evaluator 216 of FIG. 2B and/or the user focus indicator evaluator 310 of FIG. 3.

In some implementations, the response generator 410 obtains semantic assessment information from a semantic text analyzer 414. The semantic text analyzer 414 or portions thereof may be similar to and adapted from the semantic text analyzer 214 of FIG. 2B and/or the semantic text analyzer 312 of FIG. 3 and may incorporate the NLP 214a. The semantic assessment information may represent a statement presented by the user, e.g., a question asked by the user. In some implementations, the sematic assessment information represents a user's response to a statement (e.g., a question) presented to the user by the conversational agent 200, e.g., a user selection of a subtopic of interest that is associated with the user focus indicator value.

In some implementations, a content obtainer 416 obtains one or more media content items that provide information about the subject indicated by the user focus indicator value. For example, the content obtainer 416 may obtain audio content, video clips, images, and/or text relating to the subject indicated by the user focus indicator value. In some implementations, the content obtainer 416 obtains the one or more media content items from a datastore 418. In some implementations, the datastore 418 or portions thereof are similar to and adapted from the datastore 224 of FIG. 2B and/or the datastore 318 of FIG. 3. The content obtainer 416 may obtain the one or more media content items from a resource available via a network 420. In some implementations, the network 420 or portions thereof are similar to or adapted from the network 226 of FIG. 2B and/or the network 320 of FIG. 3. The content obtainer 416 may obtain the one or more media content items from different sources. For example, the content obtainer 416 may obtain a first media content item from the datastore 418 and a second media content item from the resource available via the network 420.

In some implementations, the content obtainer 416 obtains media content items from a plurality of text corpora. The text corpora may include, for example, books, articles, and/or other content items available from resources including the datastore 418 and/or other resources available via the network 420.

In some implementations, a content selector 422 selects media content items for inclusion in the response from the one or more media content items obtained by the content obtainer 416. For example, a particular media content item may be selected if it satisfies the user comprehension value 411. A media content item may not be selected if it does not satisfy the user comprehension value 411, e.g., if it is of a complexity level that is too high or too low relative to the user's current level of comprehension of the subject matter. In some implementations, the content selector 422 selects media content items for inclusion in the response based on the user focus indicator value. The content selector 422 may select media content items for inclusion in the response based on a specific question asked by the user that relates to the user focus indicator value.

In some implementations, a response synthesizer 424 synthesizes the response based on the selected media content items. For example, the response synthesizer 424 may combine the selected media content items into a single output media content item. In some implementations, the response synthesizer 424 edits one or more of the selected media content items. For example, the response synthesizer 424 may extract portions of one or more of the selected media content items. In some implementations, the response synthesizer 424 combines extracted portions of the selected media content items. For example, the response synthesizer 424 may combine a first portion of a first selected media content item and a second portion of a second media content item to create an output media content item.

In some implementations, the response synthesizer 424 uses a text-to-speech engine to generate a response comprising an audio content item, e.g., a speech output, based on a text-based response. In some implementations, the response synthesizer 424 modulates one or more aspects of the audio content item, such as tonal qualities, amplitude, inflection, accent, rate of speech, etc. to impart a semblance of emotion and/or expressivity to the response. These aspects of the audio content item may be modulated based on the user focus indicator value, the user comprehension value, and/or a question relating to the user focus indicator value, for example, to increase the user's engagement with the conversational agent. In some implementations, the response synthesizer 424 modulates the tonal qualities, amplitude, inflection, accent, rate of speech, etc., of the audio content item to emulate a specific character or voice, such as a historical figure. For example, if the user focus indicator value relates to a historical figure, the response synthesizer 424 may generate a response that emulates the voice of the historical figure.

In some implementations, the response synthesizer 424 modulates the tonal qualities, amplitude, inflection, accent, rate of speech, etc., of the audio content item based on one or more user characteristics relating to the user. For example, the response generator 410 may develop a user profile corresponding to the user over time, e.g., based on usage history, and modulate aspects of the audio content item based on the user's preferences or based on historical data relating to the user's level of engagement with the conversational agent.

In some implementations, the response generator 410 outputs the response. For example, the response generator 410 may output the response via a speaker 426. The speaker 426 or portions thereof may be similar to and adapted from the speaker 112 of FIG. 2A. In some implementations, the response generator 410 outputs the response using an accessory device that is in communication with the response generator 410 via a wired or wireless connection. For example, the response generator 410 may output the response using wired or wireless headphones or an external speaker that communicates with the response generator 410 using a wireless communication link operating using, e.g., a BLUETOOTH® wireless communication protocol. In some implementations, the response includes a visual component. The visual component may be outputted, for example, using a touch-sensitive display system 428 (e.g., the touch-sensitive display system 114 of FIG. 2A) or an accessory device that is in communication with the response generator 410 via a wired or wireless connection, such as an external display.

Figure 5A:
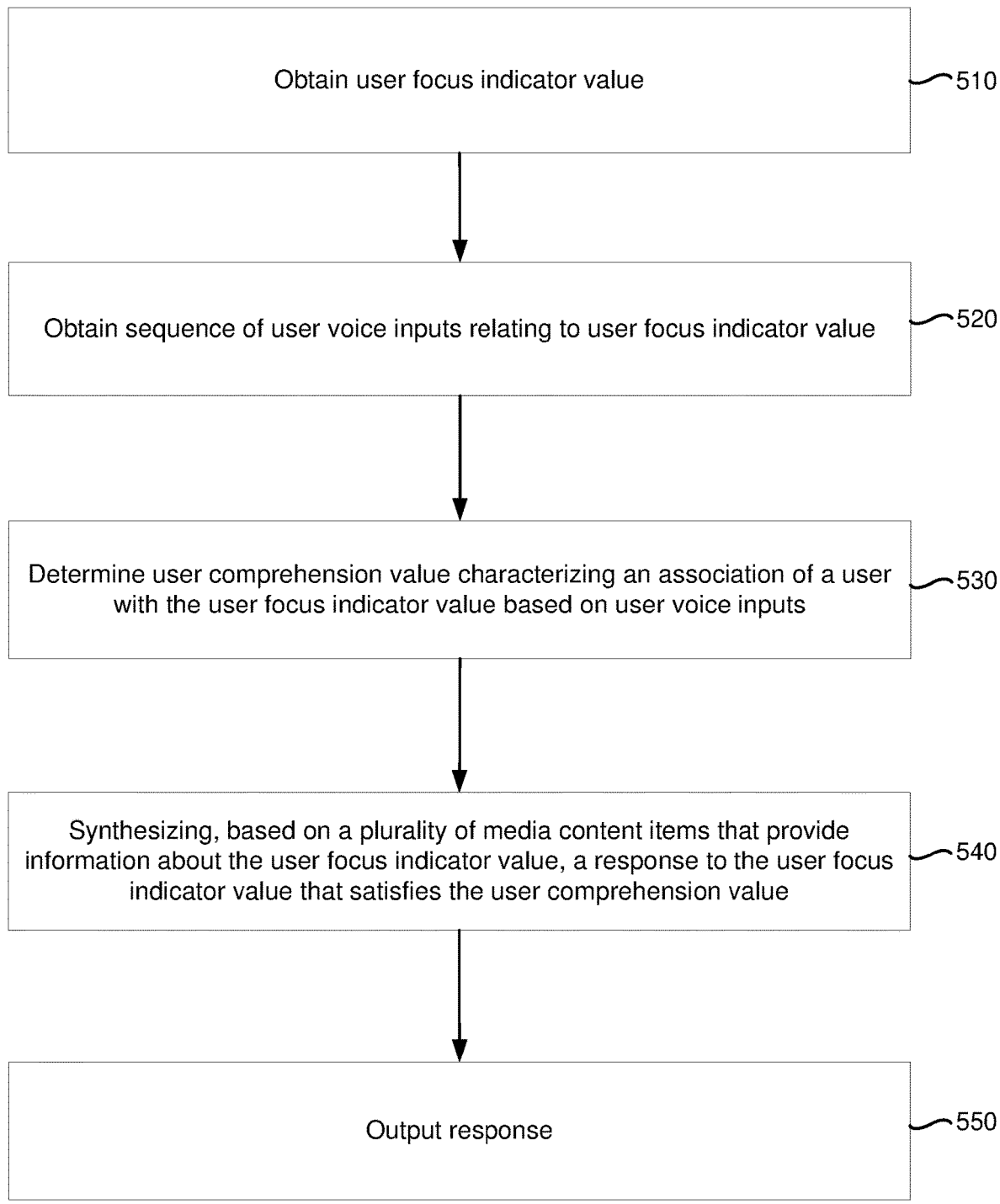
FIGS. 5A-5C are flowchart representations of a method for generating a response to a user focus indicator value in accordance with some implementations.
Figure 5B:
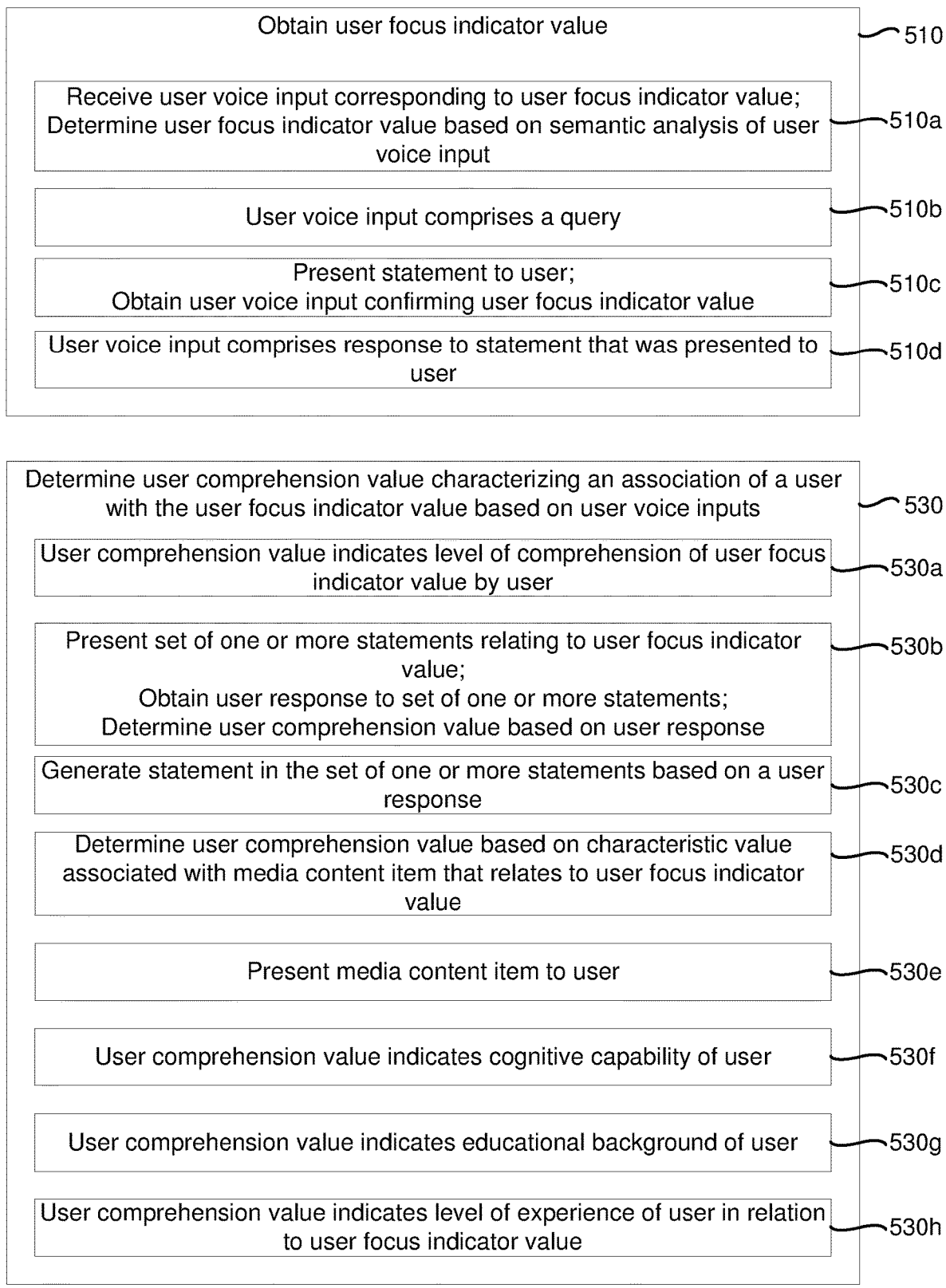
Figure 5C:
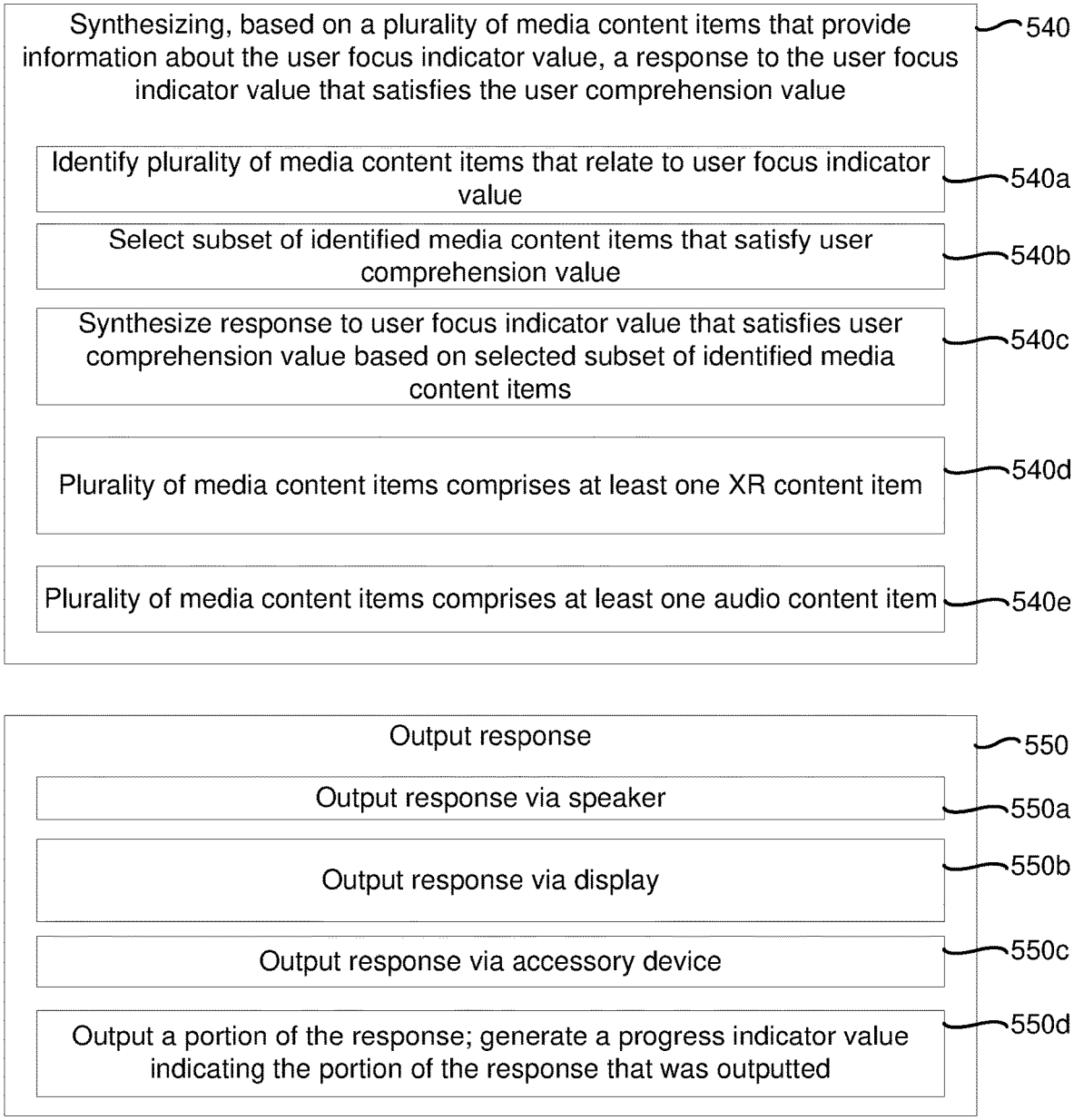

FIGS. 5A-5C are a flowchart representation of a method 500 for generating a response to a user focus indicator value based on a user comprehension value characterizing a user's association with the user focus indicator value in accordance with some implementations. In various implementations, the method 500 is performed by a device (e.g., the electronic device 4 shown in FIG. 1, the conversation agent 10 shown in FIG. 1, the electronic device 100 shown in FIG. 2A, or the conversational agent 200 shown in FIG. 2B). In some implementations, the method 500 is performed by processing logic, including hardware, firmware, software, or a combination thereof. In some implementations, the method 500 is performed by a processor executing code stored in a non-transitory computer-readable medium (e.g., a memory). Briefly, in various implementations, the method 500 includes obtaining a user focus indicator value and a sequence of user voice inputs that relate to the user focus indicator value. The method 500 includes determining a user comprehension value that characterizes an assessment of a user relative to the user focus indicator value based on the user voice inputs. In various implementations, the method 500 includes synthesizing a response to the user focus indicator value that satisfies the user comprehension value and outputting the response. The response is synthesized based on media content items that provide information about the user focus indicator value.

Referring to FIG. 5A, as represented by block 510, in various implementations, the method 500 includes obtaining a user focus indicator value (e.g., the user focus indicator value 220 shown in FIG. 2B). For example, the conversational agent 200 may receive a user input that is indicative of the user focus indicator value. Referring to FIG. 5B, as represented by block 510a, the conversational agent 200 may receive a user voice input that corresponds to the user focus indicator value and determine the user focus indicator value based on a semantic analysis of the user voice input. For example, in some implementations, the conversational agent 200 performs a semantic analysis of the user voice input and determines a subject matter on which the user is focused, e.g., a topic about which the user wishes to learn. In some implementations, as represented by block 510b, the user voice input comprises a query. For example, the user may say, "tell me about the Great Depression." In some implementations, obtaining the user focus indicator value includes obtaining an indication of a subject that the user is interested in learning about.

In some implementations, as represented by block 510c, the method 500 includes presenting a statement to the user and obtaining a user voice input that confirms the user focus indicator value. As represented by block 510d, the user voice input may include a response to the statement that was presented to the user. For example, the conversational agent 200 may present a question to the user, e.g., "Would you like to learn about cats today?" The user may then confirm the user focus indicator value with a voice input, e.g., "Yes," or provide a user input indicating that a different user focus indicator value is intended, e.g., "No, I would like to learn about hats."

In some implementations, the user voice input narrows the scope of the user focus indicator value. For example, the conversational agent 200 may present a question to the user, e.g., "Which state would you like to learn about today?" The user may respond with a voice input indicating a user selection of a subtopic of interest, e.g., a state about which the user would like to learn.

In various implementations, as represented by block 520, the method 500 includes obtaining a sequence of user voice inputs relating to the user focus indicator value. For example, the conversational agent 200 may obtain responses from the user to statements (e.g., questions) that are presented to the user by the conversational agent 200. In some implementations, the sequence of user voice inputs is dependent on previous user voice inputs. For example, the conversational agent may determine one or more additional statements (e.g., questions) to present to the user based on the user's responses to previously presented statements (e.g., questions). In some implementations, the conversational agent 200 determines one or more additional statements that are designed to elicit user responses that may characterize the assessment of the user relative to the user focus indicator value. For example, based on the user's responses to previously presented questions, the conversational agent 200 may present additional questions that relate to particular details of the user focus indicator value. These additional questions may help provide a more complete understanding of the level of comprehension of the user relative to the user focus indicator value. In some implementations, the conversational agent 200 may obtain the one or more additional statements from a datastore and/or a resource available via a network.

In some implementations, the conversational agent 200 may repeat determining additional statements to present to the user. For example, the conversational agent 200 may determine a preset number of additional statements. In some implementations, the conversational agent 200 determines the additional statements based on a rubric. The rubric may specify a sequence of statements to present based on user responses.

In various implementations, as represented by block 530, the method 500 includes determining a user comprehension value (e.g., the user comprehension value 222 shown in FIG. 2B, the user comprehension value 315 shown in FIG. 3, or the user comprehension value 411 shown in FIG. 4) that characterizes an assessment of the user relative to the user focus indicator value based on the user voice inputs. For example, as represented by block 530a, the user comprehension value may indicate a level of comprehension of the user focus indicator value by the user, e.g., how well the user understands a subject matter corresponding to the user focus indicator value.

In some implementations, as represented by block 530b, the method 500 includes presenting a set of one or more statements relating to the user focus indicator value, obtaining a user response to the set of one or more statements, and determining the user comprehension value based on the user response. As represented by block 530c, the method 500 may include generating a statement in the set of one or more statements based on a user response. For example, if the user answers a question correctly, the conversational agent 200 may present a first follow-up question. On the other hand, if the user answers the same question incorrectly, the conversational agent 200 may present a second follow-up question that is different from the first follow-up question.

In some implementations, as represented by block 530d, the method 500 includes determining the user comprehension value based on a characteristic value that is associated with a media content item that relates to the user focus indicator value. For example, the conversational agent 200 may determine the user comprehension value based on a difficulty level or complexity level associated with the media content item. As represented by block 530e, the method 500 may include presenting the media content item to the user. In some implementations, the media content item is a media content item that the user has already read, heard, or watched. For example, the user may provide a user input corresponding to an identification of the media content item to indicate media content items relating to the user focus indicator value and with which the user is familiar.

In some implementations, as represented by block 530f, the user comprehension value indicates a cognitive capability of the user. For example, the user comprehension value may indicate whether the user has a child's cognitive capability or an adult's cognitive capability. In some implementations, as represented by block 530g, the user comprehension value indicates an educational background of the user. For example, the user comprehension value may indicate whether the user has a high school education, an undergraduate education, or a graduate school education. In some implementations, as represented by block 530h, the user comprehension value indicates a level of experience of the user in relation to the user focus indicator value. For example, the user comprehension value may indicate that the user has no particular experience relating to the user focus indicator value (e.g., the user focus indicator value is heart disease, and the user is a layperson). As another example, the user comprehension value may indicate that the user has generalized experience relating to the user focus indicator value (e.g., the user focus indicator value is heart disease, and the user is a medical student). As still another example, the user comprehension value may indicate that the user has specialized experience relating to the user focus indicator value (e.g., the user focus indicator value is heart disease, and the user is a heart surgeon).

In various implementations, as represented by block 540, the method 500 includes synthesizing a response to the user focus indicator value that satisfies the user comprehension value based on a plurality of media content items that provide information about the user focus indicator value. Synthesizing a response that satisfies the user comprehension value tends to enhance a user experience of the device by providing a response that is satisfactory to the user. Providing a response that is satisfactory to the user may reduce a likelihood of the user providing unnecessary user inputs corresponding to searching for additional information that is more satisfactory to the user. Reducing unnecessary user inputs may prolong a battery life of a battery-operated device, thereby improving operability of the device.

Referring to FIG. 5C, as represented by block 540a, the method 500 may include identifying a plurality of media content items that relate to the user focus indicator value. For example, the conversational agent 200 may identify audio content, video clips, images, and/or text relating to the user focus indicator value. In some implementations, the conversational agent 200 identifies one or more media content items available from a datastore and/or from a resource via a network.

In some implementations, as represented by block 540b, the method 500 may include selecting a subset of the identified media content items that satisfy the user comprehension value. For example, the conversational agent 200 may select a particular media content item if it satisfies the user comprehension value. A media content item may not be selected if it does not satisfy the user comprehension value, e.g., if it is of a complexity level that is too high or too low relative to the user's current level of comprehension of the subject matter. The conversational agent 200 may not select a media content item if its content is redundant with the content of another media content item.

In some implementations, as represented by block 540c, the method 500 may include synthesizing the response to the user focus indicator value that satisfies the user comprehension value based on the selected subset of the identified media content items. For example, the conversational agent 200 may combine the selected media content items into a single output media content item. In some implementations, the conversational agent 200 edits one or more of the selected media content items. For example, the conversational agent 200 may extract portions of one or more of the selected media content items. In some implementations, the conversational agent 200 combines extracted portions of the selected media content items. For example, the conversational agent 200 may combine a first portion of a first selected media content item and a second portion of a second media content item to create an output media content item.

As represented by block 540d, the plurality of media content items may include at least one extended reality (XR) content item. For example, the media content items may include an image, a video clip, and/or an animation. As represented by block 540e, the plurality of media content items may include at least one audio content item. For example, the media content items may include a voice recording and/or music. In some implementations, the media content items may include text that may be displayed in connection with other media content items.

In various implementations, as represented by block 550, the method 500 includes outputting the response. As represented by block 550a, the response may be outputted via a speaker, e.g., a speaker built into a device that incorporates the conversational agent 200. In some implementations, as represented by block 550b, the response may be outputted via a display, such as a touch-sensitive display or an HMD. In some implementations, as represented by block 550c, the response may be outputted via an accessory device. The accessory device may be in communication with the device that incorporates via the conversational agent 200. Examples of accessory devices include, but are not limited to, wireless headphones, external speakers, and external displays.

In some implementations, as represented by block 550d, the method 500 includes outputting a portion of the response and generating a progress indicator value indicating the portion of the response that was outputted. For example, the user may provide a user input to stop or pause the output of the response. The progress indicator value may be generated to indicate an amount of progress that was made relative to the response. The user may then resume outputting the remainder of the response that had not yet been outputted.

It will be appreciated that the figures are intended as a functional description of the various features which may be present in a particular implementation as opposed to a structural schematic of the implementations described herein. As recognized by those of ordinary skill in the art, items shown separately could be combined and some items could be separated. For example, some functional blocks shown separately in the figures could be implemented as a single block, and the various functions of single functional blocks could be implemented by one or more functional blocks in various implementations. The actual number of blocks and the division of particular functions and how features are allocated among them will vary from one implementation to another and, in some implementations, depends in part on the particular combination of hardware, software, and/or firmware chosen for a particular implementation.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
at a device including a display, a microphone, a speaker, a non-transitory memory, and one or more processors coupled with the non-transitory memory:
displaying, on the display, a graphical user interface for interacting with a conversational agent and generating media content;
receiving, via the graphical user interface, a query that indicates a subject that a user of the device interested in learning about;
after receiving the query indicating the subject that the user is interested in learning about:
displaying, by the conversational agent, a first prompt within the graphical user interface requesting the user provide a first response related to the subject that the user is interested in learning about;
displaying, based on an evaluation of the first response, a second prompt within the graphical user interface requesting a second response related to the subject;
determining, by the conversational agent, based on the first response and the second response, a user comprehension value characterizing a level of knowledge of the user with respect to the subject;
synthesizing, by the conversational agent, based on a plurality of existing media content items that provide information about the subject and the user comprehension value, a new media content item that includes information regarding the subject that the user is interested in learning about and that is tailored to the level of knowledge of the user indicated by the comprehension value, wherein synthesizing the new media content item comprises modulating an audio characteristic of the new media content item based on a user preference indicated by a user profile, and wherein the user profile is developed based on a usage history; and
presenting, on the display, the new media content item via the graphical user interface, wherein presenting the new media content item comprises outputting an audio portion of the new media content item via the speaker, and wherein the new audio portion includes the modulated audio characteristic.

2. The method of claim 1, wherein the query is based on a user focus indicator value, and wherein receiving the query comprises:
receiving a user voice input that corresponds to a user focus indicator value;
generating two or more temporal frames of correlated data from the user voice input and other input data; and
determining semantic assessments based on the generated two or more temporal frames; and
determining, based on the semantic assessments, the user focus indicator value.

3. The method of claim 1, wherein the plurality of existing media content items comprises at least one audio content item.

4. The method of claim 1, wherein synthesizing the new media content item comprises generating a new video content item.

5. The method of claim 1, wherein displaying the second prompt comprises:
determining whether or not the first response is a correct response to the first prompt; and
displaying the second prompt in response to determining that the first response is the correct response to the first prompt.

6. The method of claim 1, wherein the second prompt is associated with a greater difficulty than the first prompt.

7. The method of claim 1, further comprising:
displaying additional prompts of increasing difficulty until receiving an incorrect response.

8. The method of claim 1, further comprising:
generating, by a privacy subsystem that includes one or more privacy setting filters, an anonymized version of the first and second responses in order to limit the conversational agent from accessing private information pertaining to the user; and determining the user comprehension value based on the anonymized version.

9. The method of claim 1, wherein the plurality of existing media content items includes a combination of an existing audio content item, an existing video content item, an existing image, and existing text.

10. The method of claim 1, wherein synthesizing the new media content item comprises:
obtaining a first existing media content item of the plurality of existing media content items from a datastore;
including a portion of the first existing media content item in the new media content item;
obtaining a second existing media content item of the plurality of existing media content items via a network; and
including a portion of the second existing media content item in the new media content item.

11. The method of claim 1, wherein synthesizing the new media content item comprises:
selecting a first subset of the plurality of existing media content items that satisfies the user comprehension value;
foregoing selection of a second subset of the plurality of existing media content items that does not satisfy the user comprehension value; and
synthesizing the new media content item based on information included in the first subset of the plurality of existing media content items.

12. The method of claim 1, wherein synthesizing the new media content item comprises:
generating, by a text-to-speech engine, a second audio portion of the new media content item based on text included in one of the plurality of existing media content items.

13. The method of claim 1, wherein the subject is a character; and
wherein synthesizing the new media content item includes generating a third audio portion of the new media content item that emulates a voice of the character.

14. A device, comprising:
one or more processors;
a non-transitory memory;
a display;
a microphone;
a speaker; and
one or more programs stored in the non-transitory memory, which, when executed by the one or more processors, cause the device to:
display, on the display, a graphical user interface for interacting with a conversational agent and generating media content;
receive, via the graphical user interface, a query that indicates a subject that a user of the device interested in learning about;
after receiving the query indicating the subject that the user is interested in learning about:
display, by the conversational agent, a first prompt within the graphical user interface requesting the user provide a first response related to the subject that the user is interested in learning about;
display, based on an evaluation of the first response, a second prompt within the graphical user interface requesting a second response related to the subject;
determine, by the conversational agent, based on the first response and the second response, a user comprehension value characterizing a level of knowledge of the user with respect to the subject;
synthesize, by the conversational agent, based on a plurality of existing media content items that provide information about the subject and the user comprehension value, a new media content item that includes information regarding the subject that the user is interested in learning about and that is tailored to the level of knowledge of the user indicated by the comprehension value, wherein synthesizing the new media content item comprises modulating an audio characteristic of the new media content item based on a user preference indicated by a user profile, and wherein the user profile is developed based on a usage history; and
present, on the display, the new media content item via the graphical user interface, wherein presenting the new media content item comprises outputting an audio portion of the new media content item via the speaker, and wherein the new audio portion includes the modulated audio characteristic.

15. The device of claim 14, wherein the subject is a character; and
wherein synthesizing the new media content item includes generating a third audio portion of the new media content item that emulates a voice of the character.

16. The device of claim 14, wherein the query is based on a user focus indicator value, and wherein receiving the query comprises:
receiving a user voice input that corresponds to a user focus indicator value;
generating two or more temporal frames of correlated data from the user voice input and other input data; and
determining semantic assessments based on the generated two or more temporal frames; and
determining, based on the semantic assessments, the user focus indicator value.

17. The device of claim 14, wherein the plurality of existing media content items comprises at least one audio content item.

18. The device of claim 14, wherein synthesizing the new media content item comprises generating a new video content item.

19. The device of claim 14, wherein displaying the second prompt comprises:
determining whether or not the first response is a correct response to the first prompt; and
displaying the second prompt in response to determining that the first response is the correct response to the first prompt.

20. The device of claim 14, wherein the second prompt is associated with a greater difficulty than the first prompt.

21. The device of claim 14, wherein the one or more programs stored in the non-transitory memory, when executed by the one or more processors, further cause the device to:
display additional prompts of increasing difficulty until receiving an incorrect response.

22. The device of claim 14, wherein the one or more programs stored in the non-transitory memory, when executed by the one or more processors, further cause the device to:
generate, by a privacy subsystem that includes one or more privacy setting filters, an anonymized version of the first and second responses in order to limit the conversational agent from accessing private information pertaining to the user; and determine the user comprehension value based on the anonymized version.

23. The device of claim 14, wherein the plurality of existing media content items includes a combination of an existing audio content item, an existing video content item, an existing image, and existing text.

24. The device of claim 14, wherein synthesizing the new media content item comprises:
   obtaining a first existing media content item of the plurality of existing media content items from a datastore;
   including a portion of the first existing media content item in the new media content item;
   obtaining a second existing media content item of the plurality of existing media content items via a network; and
   including a portion of the second existing media content item in the new media content item.

25. The device of claim 14, wherein synthesizing the new media content item comprises:
   selecting a first subset of the plurality of existing media content items that satisfies the user comprehension value;
   foregoing selection of a second subset of the plurality of existing media content items that does not satisfy the user comprehension value; and
   synthesizing the new media content item based on information included in the first subset of the plurality of existing media content items.

26. The device of claim 14, wherein synthesizing the new media content item comprises:
   generating, by a text-to-speech engine, a second audio portion of the new media content item based on text included in one of the plurality of existing media content items.

27. A non-transitory memory storing one or more programs,
   which when executed by one or more processors of a device including a display, a speaker, and a microphone, cause the device to:
   display, on the display, a graphical user interface for interacting with a conversational agent and generating media content;
   receive, via the graphical user interface, a query that indicates a subject that a user of the device interested in learning about;
   after receiving the query indicating the subject that the user is interested in learning about:
      display, by the conversational agent, a first prompt within the graphical user interface requesting the user provide a first response related to the subject that the user is interested in learning about;
      display, based on an evaluation of the first response, a second prompt within the graphical user interface requesting a second response related to the subject;
      determine, by the conversational agent, based on the first response and the second response, a user comprehension value characterizing a level of knowledge of the user with respect to the subject;
      synthesize, by the conversational agent, based on a plurality of existing media content items that provide information about the subject and the user comprehension value, a new media content item that includes information regarding the subject that the user is interested in learning about and that is tailored to the level of knowledge of the user indicated by the comprehension value, wherein synthesizing the new media content item comprises modulating an audio characteristic of the new media content item based on a user preference indicated by a user profile, and wherein the user profile is developed based on a usage history; and
      present, on the display, the new media content item via the graphical user interface, wherein presenting the new media content item comprises outputting an audio portion of the new media content item via the speaker, and wherein the new audio portion includes the modulated audio characteristic.

28. The non-transitory memory of claim 27, wherein the subject is a character; and
   wherein synthesizing the new media content item includes generating a third audio portion of the new media content item that emulates a voice of the character.

29. The non-transitory computer-readable storage medium of claim 27, wherein the query is based on a user focus indicator value, and wherein receiving the query comprises:
   receiving a user voice input that corresponds to a user focus indicator value;
   generating two or more temporal frames of correlated data from the user voice input and other input data; and
   determining semantic assessments based on the generated two or more temporal frames; and
   determining, based on the semantic assessments, the user focus indicator value.

30. The non-transitory computer-readable storage medium of claim 27, wherein the plurality of existing media content items comprises at least one audio content item.

31. The non-transitory computer-readable storage medium of claim 27, wherein synthesizing the new media content item comprises generating a new video content item.

32. The non-transitory computer-readable storage medium of claim 27, wherein displaying the second prompt comprises:
   determining whether or not the first response is a correct response to the first prompt; and
   displaying the second prompt in response to determining that the first response is the correct response to the first prompt.

33. The non-transitory computer-readable storage medium of claim 27, wherein the second prompt is associated with a greater difficulty than the first prompt.

34. The non-transitory computer-readable storage medium of claim 27, wherein the one or more programs stored in the non-transitory memory, when executed by the one or more processors, further cause the device to:
   display additional prompts of increasing difficulty until receiving an incorrect response.

35. The non-transitory computer-readable storage medium of claim 27, wherein the one or more programs stored in the non-transitory memory, when executed by the one or more processors, further cause the device to:
   generate, by a privacy subsystem that includes one or more privacy setting filters, an anonymized version of the first and second responses in order to limit the conversational agent from accessing private information pertaining to the user; and
   determine the user comprehension value based on the anonymized version.

36. The non-transitory computer-readable storage medium of claim 27, wherein the plurality of existing media content items includes a combination of an existing audio content item, an existing video content item, an existing image, and existing text.

37. The non-transitory computer-readable storage medium of claim 27, wherein synthesizing the new media content item comprises:
- obtaining a first existing media content item of the plurality of existing media content items from a datastore;
- including a portion of the first existing media content item in the new media content item;
- obtaining a second existing media content item of the plurality of existing media content items via a network; and
- including a portion of the second existing media content item in the new media content item.

38. The non-transitory computer-readable storage medium of claim 27, wherein synthesizing the new media content item comprises:
- selecting a first subset of the plurality of existing media content items that satisfies the user comprehension value;
- foregoing selection of a second subset of the plurality of existing media content items that does not satisfy the user comprehension value; and
- synthesizing the new media content item based on information included in the first subset of the plurality of existing media content items.

39. The non-transitory computer-readable storage medium of claim 27, wherein synthesizing the new media content item comprises:
- generating, by a text-to-speech engine, a second audio portion of the new media content item based on text included in one of the plurality of existing media content items.

* * * * *

UNITED STATES PATENT AND TRADEMARK OFFICE
CERTIFICATE OF CORRECTION

| | |
|---|---|
| PATENT NO. | : 12,249,253 B1 |
| APPLICATION NO. | : 17/370048 |
| DATED | : March 11, 2025 |
| INVENTOR(S) | : Ian M. Richter et al. |

Page 1 of 1

It is certified that error appears in the above-identified patent and that said Letters Patent is hereby corrected as shown below:

In the Claims

In Column 26, Line 15, delete "computer-readable storage medium" and insert --memory-- therefor.

In Column 26, Line 28, delete "computer-readable storage medium" and insert --memory-- therefor.

In Column 26, Line 31, delete "computer-readable storage medium" and insert --memory-- therefor.

In Column 26, Line 34, delete "computer-readable storage medium" and insert --memory-- therefor.

In Column 26, Line 43, delete "computer-readable storage medium" and insert --memory-- therefor.

In Column 26, Line 46, delete "computer-readable storage medium" and insert --memory-- therefor.

In Column 26, Line 52, delete "computer-readable storage medium" and insert --memory-- therefor.

In Column 26, Line 63, delete "computer-readable storage medium" and insert --memory-- therefor.

In Column 27, Line 1, delete "computer-readable storage medium" and insert --memory-- therefor.

In Column 27, Line 13, delete "computer-readable storage medium" and insert --memory-- therefor.

Column 27, Line 25, delete "computer-readable storage medium" and insert --memory-- therefor.

Signed and Sealed this
Twentieth Day of May, 2025

Coke Morgan Stewart
*Acting Director of the United States Patent and Trademark Office*